United States Patent
Yoon

(10) Patent No.: US 9,528,604 B2
(45) Date of Patent: Dec. 27, 2016

(54) CLUTCH FAILURE DIAGNOSTIC METHOD FOR DCT

(71) Applicants: Hyundai Motor Company, Seoul (KR); Kia Motors Corp., Seoul (KR)

(72) Inventor: Young Min Yoon, Seoul (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 250 days.

(21) Appl. No.: 14/293,959

(22) Filed: Jun. 2, 2014

(65) Prior Publication Data

US 2015/0166036 A1 Jun. 18, 2015

(30) Foreign Application Priority Data

Dec. 18, 2013 (KR) .................. 10-2013-0157844

(51) Int. Cl.
*F16H 61/12* (2010.01)
*F16H 61/688* (2006.01)

(52) U.S. Cl.
CPC ........... *F16H 61/688* (2013.01); *F16H 61/12* (2013.01); *F16H 2061/1208* (2013.01); *F16H 2061/128* (2013.01); *Y10T 477/641* (2015.01)

(58) Field of Classification Search
CPC .................. F16H 61/12; F16H 61/688
See application file for complete search history.

(56) References Cited

U.S. PATENT DOCUMENTS 6,113,517 A 9/2000 Salecker et al.

FOREIGN PATENT DOCUMENTS

| JP | 2006-132574 A | 5/2006 |
|----|----|----|
| JP | 2006-283818 A | 10/2006 |
| JP | 2009-67128 A | 4/2009 |
| KR | 1996-0007247 A | 3/1996 |
| KR | 10-2012-0038797 A | 4/2012 |

*Primary Examiner* — Derek D Knight
(74) *Attorney, Agent, or Firm* — Morgan, Lewis & Bockius LLP

(57) ABSTRACT

A clutch failure diagnostic method for a dual clutch transmission (DCT), may include a synchronous clutch confirming step of confirming whether a clutch rotating in synchronization with an engine speed may be present after a cranking of an engine, when the clutch rotating in the synchronization with the engine speed may be determined to be present, a gear joining attempting step of attempting to join shift gears connected to the clutch rotating in the synchronization with the engine speed, and a failure determining step of determining that a corresponding clutch fails when the gears may be not joined, as a performance result of the gear joining attempting step.

10 Claims, 2 Drawing Sheets

CLUTCH FAILURE DIAGNOSTIC METHOD FOR DCT

CROSS REFERENCE TO RELATED APPLICATION

The present application claims priority to Korean Patent Application No. 10-2013-0157844 filed on Dec. 18, 2013, the entire contents of which is incorporated herein for all purposes by this reference.

BACKGROUND OF THE INVENTION

Field of the Invention

The present invention relates to a clutch failure diagnostic method for a DCT, and more particularly, to a technology to appropriately diagnose a stuck on phenomenon that a clutch configuring a DCT is not normally operated.

Description of Related Art

Recently, a development of an automatic manual transmission capable of simultaneously achieving driving convenience of an automatic transmission, fuel efficiency of a manual transmission, and high power efficiency has been frequently conducted. Herein, a dual clutch transmission (DCT) may be considered as a kind of automatic manual transmission as described above.

The automated manual transmission is a system which automatically performs a clutch operation and a gear transmission based on a manual transmission, in which the operation is performed by using an actuator driven with a hydraulic pressure or a motor. In particular, the clutch is configured of a dry clutch and when the clutch is controlled by a motor, the clutch is configured to be controlled with a complicated link structure. When a failure of the link or a stuck of the clutch occurs, a stall of an engine occurs and thus marketability is greatly degraded or a sudden unintended acceleration occurs, such that a driver may be a dangerous situation. Therefore, there is a need to accurately determine a failure.

FIG. 1 illustrates a situation in which a clutch 1 is stuck on to perform a cranking of the engine in the state in which the engine and the clutch 1 is approximately directly connected to each other, and illustrate that as an engine speed is increased by the cranking of the engine, a speed of the clutch 1 is increased in synchronization with the engine speed.

As described above, when the cranking of the engine is performed in the state in which the clutch is stuck on, other related components may be broken and the sudden unintended acceleration phenomenon may occur. However, as described above, it is difficult to actually differentiate whether the situation in which the clutch speed is increased approximately in proportion to the increase in the engine speed at the time of the cranking of the engine occurs due to the stuck on or a drag of components within the transmission.

The matters described as the related art have been provided only for assisting in the understanding for the background of the present invention and should not be considered as corresponding to the related art known to those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a clutch failure diagnostic method for a DCT to be able to secure marketability and safety of a vehicle by early diagnosing appropriately in the case in which a stuck on phenomenon that the clutch is not controlled occurs in the state in which the clutch is locked in a DCT mounted in a vehicle.

In an aspect of the present invention, a clutch failure diagnostic method for a dual clutch transmission (DCT), may include a synchronous clutch confirming step of confirming whether a clutch rotating in synchronization with an engine speed is present after a cranking of an engine; when the clutch rotating in the synchronization with the engine speed is determined to be present, a gear joining attempting step of attempting to join shift gears connected to the clutch rotating in the synchronization with the engine speed; and a failure determining step of determining that a corresponding clutch fails when the gears are not joined, as a performance result of the gear joining attempting step.

In the gear joining attempting step, attempting to join at least two different shift gears of a plurality of gear shifts connected to the clutch rotating in the synchronization with the engine in order is made.

The gear joining attempting step may include a first sub joining step of joining any one shift gear of a plurality of shift gears connected to the clutch rotating in the synchronization with the engine; and a second sub joining step of joining another shift gear other than the any one shift gear attempted to be joined in the first sub joining step among the plurality of shift gears connected to the clutch rotating in the synchronization with the engine when in the first sub joining step, the joining of the any one shift gear fails.

As a performance result of the first sub joining step, when a corresponding shaft gear is determined to be joined, it is determined that the clutch is normal.

When the joining of the any one shift gear fails in the first sub joining step and the second sub joining step is further performed and shift gears are joined as a performance result of the second sub joining step, it is determined that the clutch is not a stuck on failure.

When the shift gears are not joined in the performance of the second sub joining step, it is determined that the clutch is the stuck on failure.

As the performance result of the synchronous clutch confirming step, when the clutch rotating in the synchronization with the engine speed is absent, it is determined that the clutch is normal.

As the performance result of the gear joining attempting step, when the shift gears are joined, it is determined that the clutch is normal.

In another aspect of the present invention, a clutch failure diagnostic method for an automatic manual transmission, may include after a cranking of an engine, a step of confirming whether a clutch rotates in synchronization with an engine speed; when the clutch rotates in the synchronization with the engine speed, a step of attempting to join shift gears connected to the clutch; and as a performance result of the gear joining attempting step, when the shift gears are not joined, a step of determining that the clutch fails.

In the step of attempting to join the shift gears connected to the clutch, attempting to join at least two different shift gears among a plurality of gear shifts connected to the clutch in order is made.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a diagram illustrating a situation in which a cranking of an engine is performed in the state in which a clutch 1 is stuck on.

Figure 1:
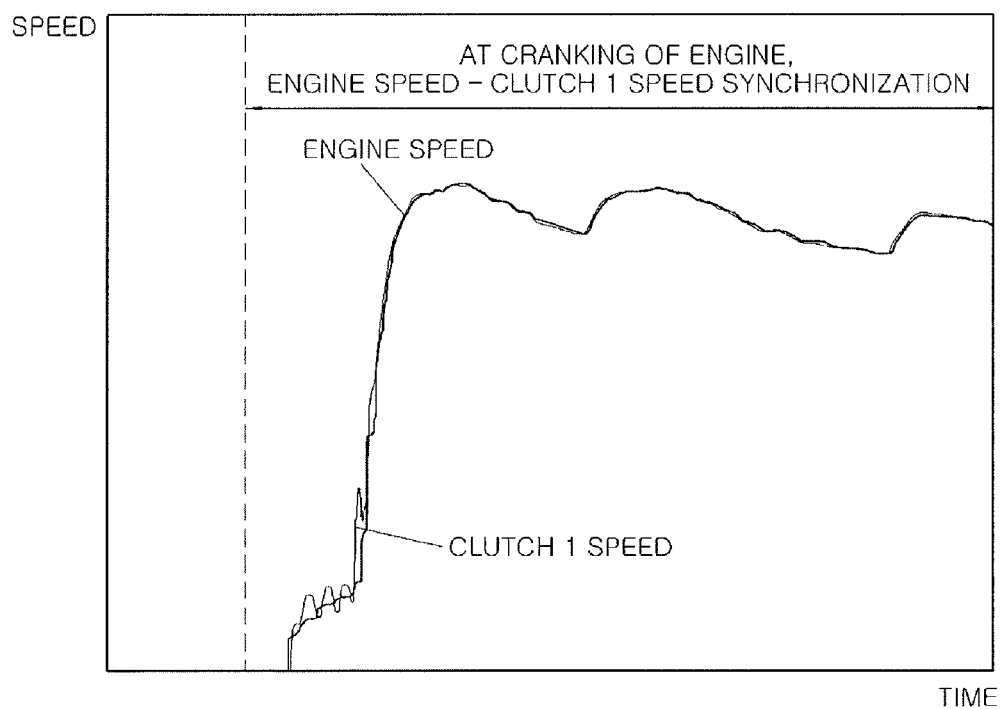

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
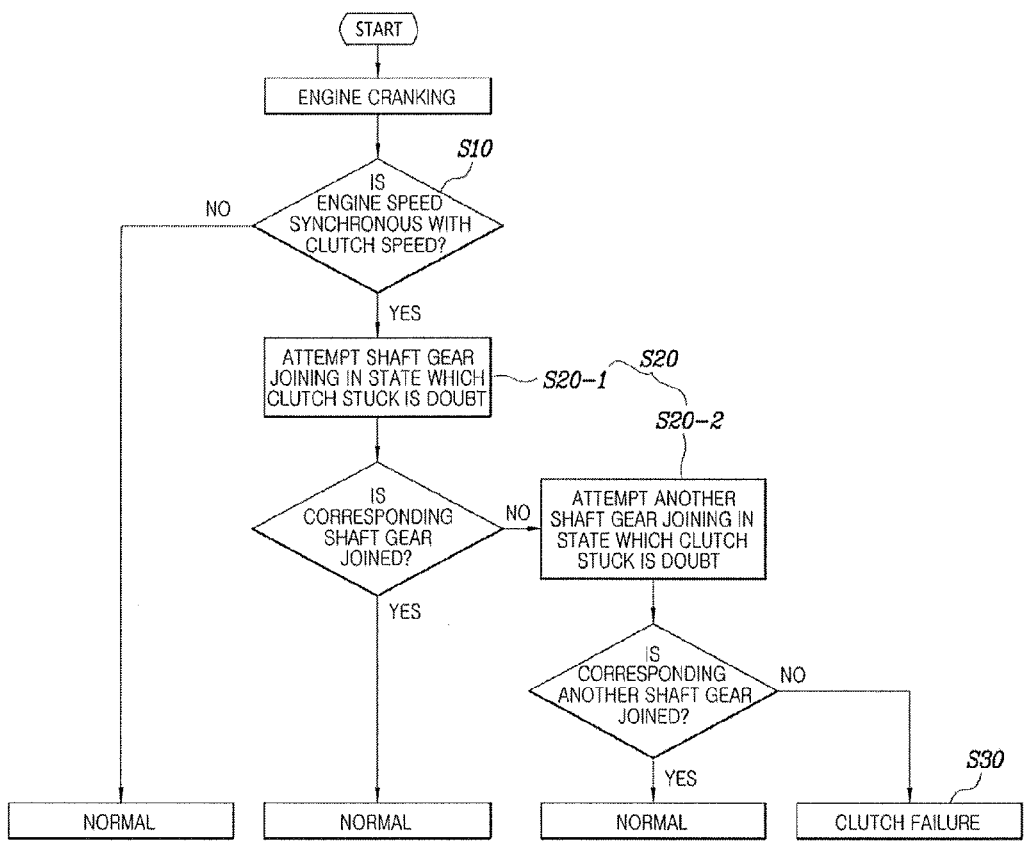
FIG. 2 is a flow chart illustrating a clutch failure diagnostic method for a DCT according to an exemplary embodiment of the present invention.

Referring to FIG. 2, a clutch failure diagnostic method for DCT according to an exemplary embodiment of the present invention is configured to include: a synchronous clutch confirming step (S10) of confirming whether a clutch rotating in synchronization with an engine speed is present after a cranking of an engine, when the clutch rotating in synchronization with the engine speed is present, a gear joining attempting step (S20) of attempting to join shift gears connected to the clutches rotating in synchronization with the engine speed, and a failure determining step (S30) of determining that the corresponding clutch fails when the gears are not joined, as the performance result of the gear joining attempting step (S20).

That is, in the case in which the clutch rotating with the engine is present at the time of the cranking of the engine, by attempting to join the shift gear of the corresponding clutch, it is determined that the clutch failure occurs due to a drag of internal components, and the like rather than a stuck on when the shift gears are joined and in the case in which the shift gears are not joined, it is determined that the clutch failure is due to the stuck on.

In the gear joining attempting step (S20), attempting to join at least two different shift gears among the plurality of gear shifts connected to the clutch rotating in synchronization with the engine in order may be preferable.

That is, according to the exemplary embodiment of the present invention, the attempting of the gear joining (S20) is configured to include a first sub joining step of joining any one shift gear of the plurality of shift gears connected to the clutch rotating in synchronization with the engine (S20-1), and a second sub joining step (S20-2) of joining another shift gear other than the shift gears attempted to be joined in the first sub joining step (S20-1) among the plurality of shift gears connected to the clutch rotating in synchronization with the engine in the case in which in the first sub joining (S20-1), the gear joining fails.

Therefore, it may more accurately determine the clutch stuck on failure by doubly joining the shift gears in order.

That is, when the gear joining fails in the first sub joining step (S20-1), it is determined to be a situation in which the clutch stuck on failure is doubtable, when the second sub joining step (S20-2) is further performed and the shift gears are joined as the performance result of the second sub joining step (S20-2), it is considered that the gear fastening is not made due to a wear of components associated with the shift gear in the first sub joining step (S20-1), and the like and thus it is determined that the clutch is not the stuck on failure, and when the shift gears are not joined even in the performance of the second sub joining step (S20-2), it may be more certainly determined that the clutch is the stuck on failure.

Further, as the performance result of the synchronous clutch confirming step (S10), when the clutch rotating in synchronization with the engine speed is absent, it is determined that the clutches are normal and as the performance result of the gear joining attempting step (S20), when the gears are joined, it is determined that the clutches are normal.

As described above, the exemplary embodiment of the present invention may be applied to only the vehicle mounted with the DCT as well as the above-mentioned method may be applied to an automatic manual transmission of a broader concept than the DCT, in more detail, even the automatic manual transmission mounted with only one clutch.

That is, when the present invention as described above is applied to the automatic manual transmission, the method may be configured to include: after the cranking of the engine, a step of confirming whether the clutch rotates in synchronization with the engine speed, when the clutch rotates in synchronization with the engine speed, a step of attempting to join the shift gears connected to the clutches, and as the performance result of the gear joining attempting step (S20), when the gears are not joined, a step of determining that the clutch fails.

Further, in the step of attempting to join the shift gears connected to the clutches, similar to the above description, attempting to join at least two different shift gears among the plurality of shift gears connected to the clutches in order may be preferable.

According to the exemplary embodiments of the present invention, it is possible to secure marketability and safety of a vehicle by early diagnosing appropriately the case in which the stuck on phenomenon that the clutch is not controlled occurs in the state in which the clutches are joined in the DCT mounted in the vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings.

The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A clutch failure diagnostic method for a dual clutch transmission (DCT), comprising:
   a synchronous clutch confirming step of confirming whether a clutch rotating in synchronization with an engine speed is present after a cranking of an engine when the clutch has been released;
   when the clutch rotating in the synchronization with the engine speed is determined to be present, a gear engaging attempting step of attempting to engage a plurality of shift gears connected to the clutch rotating in the synchronization with the engine speed; and
   a failure determining step of determining that the clutch fails when the gears are not engaged, as a performance result of the gear engaging attempting step.

2. The clutch failure diagnostic method for the DCT of claim 1, wherein in the gear engaging attempting step, attempting to engage at least two different shift gears of the plurality of shift gears connected to the clutch rotating in the synchronization with the engine is made.

3. The clutch failure diagnostic method for the DCT of claim 1, wherein the gear engaging attempting step includes:
   a first sub engaging step of engaging any one shift gear of the plurality of shift gears connected to the clutch rotating in the synchronization with the engine; and
   a second sub engaging step of engaging another shift gear other than the any one shift gear attempted to be engaged in the first sub engaging step among the plurality of shift gears connected to the clutch rotating in the synchronization with the engine when in the first sub engaging step, the engaging of the any one shift gear fails.

4. The clutch failure diagnostic method for the DCT of claim 3, wherein as a performance result of the first sub engaging step, when a corresponding shift gear among the plurality of shift gears is determined to be engaged, it is determined that the clutch is normal.

5. The clutch failure diagnostic method for the DCT of claim 3, wherein when the engaging of the any one shift gear fails in the first sub engaging step and the second sub engaging step is further performed and shift gears are engaged as a performance result of the second sub engaging step, it is determined that the clutch is not a stuck on failure.

6. The clutch failure diagnostic method for the DCT of claim 5, wherein when the shift gears are not engaged in the performance of the second sub engaging step, it is determined that the clutch is the stuck on the failure.

7. The clutch failure diagnostic method for the DCT of claim 1, wherein as the performance result of the synchronous clutch confirming step, when the clutch rotating in the synchronization with the engine speed is absent, it is determined that the clutch is normal.

8. The clutch failure diagnostic method for the DCT of claim 1, wherein as the performance result of the gear engaging attempting step, when the shift gears are engaged, it is determined that the clutch is normal.

9. A clutch failure diagnostic method for an automatic manual transmission, comprising:
   after a cranking of an engine, a step of confirming whether a clutch rotates in synchronization with an engine speed though when the clutch has been released;
   when the clutch rotates in the synchronization with the engine speed, a step of attempting to engage shift gears connected to the clutch; and
   as a performance result of the gear engaging attempting step, when the shift gears are not engaged, a step of determining that the clutch fails.

10. The clutch failure diagnostic method for the automatic manual transmission of claim 9, wherein in the step of attempting to engage the shift gears connected to the clutch, attempting to engage at least two different shift gears among a plurality of shift gears connected to the clutch is made.

* * * * *